United States Patent
David

(10) Patent No.: US 12,534,642 B2
(45) Date of Patent: Jan. 27, 2026

(54) COMPOSITION FOR STRUCTURAL ADHESIVES

(71) Applicant: JACRET, Le Thillay (FR)

(72) Inventor: Régis David, Ermont (FR)

(73) Assignee: JACRET, Le Thillay (FR)

( * ) Notice: Subject to any disclaimer, the term of this patent is extended or adjusted under 35 U.S.C. 154(b) by 717 days.

(21) Appl. No.: 17/262,295

(22) PCT Filed: Jul. 23, 2019

(86) PCT No.: PCT/EP2019/069781
§ 371 (c)(1),
(2) Date: Jan. 22, 2021

(87) PCT Pub. No.: WO2020/020877
PCT Pub. Date: Jan. 30, 2020

(65) Prior Publication Data
US 2021/0332266 A1 Oct. 28, 2021

(30) Foreign Application Priority Data
Jul. 24, 2018 (FR) ........................ 1856878

(51) Int. Cl.
| | |
|---|---|
| *C09J 4/06* | (2006.01) |
| *C08F 220/18* | (2006.01) |
| *C08F 220/28* | (2006.01) |
| *C08F 287/00* | (2006.01) |
| *C08F 293/00* | (2006.01) |
| *C08K 5/14* | (2006.01) |
| *C08L 53/02* | (2006.01) |
| *C09J 153/02* | (2006.01) |

(52) U.S. Cl.
CPC ........... *C09J 4/06* (2013.01); *C08F 220/1808* (2020.02); *C08F 220/282* (2020.02); *C08F 287/00* (2013.01); *C08F 293/005* (2013.01); *C08K 5/14* (2013.01); *C08L 53/02* (2013.01); *C09J 153/02* (2013.01)

(58) Field of Classification Search
CPC . C09J 4/06; C09J 133/04; C09J 133/08; C09J 133/10; C09J 133/14; C08F 220/282; C08F 220/1808; C08F 287/00
See application file for complete search history.

(56) References Cited

U.S. PATENT DOCUMENTS

| | | | |
|---|---|---|---|
| 3,985,703 A | 10/1976 | Ferry et al. | |
| 4,304,709 A | 12/1981 | Salee | |
| 5,106,917 A | 4/1992 | Lee et al. | |
| 5,241,002 A | 8/1993 | Ohashi et al. | |
| 6,433,091 B1 | 8/2002 | Cheng | |
| 6,869,497 B2 | 3/2005 | Doe et al. | |
| 2005/0238603 A1 | 10/2005 | Themens et al. | |
| 2006/0155045 A1 | 7/2006 | Tsuno et al. | |
| 2010/0084092 A1 | 4/2010 | Curet et al. | |
| 2010/0116435 A1 | 5/2010 | Curet et al. | |
| 2011/0083804 A1 | 4/2011 | Curet | |
| 2012/0252978 A1 | 10/2012 | Curet | |
| 2014/0128536 A1 | 5/2014 | Hilf et al. | |
| 2014/0364542 A1 | 12/2014 | Flosbach et al. | |
| 2017/0306191 A1 | 10/2017 | Curet | |
| 2019/0031638 A1* | 1/2019 | Beyer | .............. C08F 220/26 |

FOREIGN PATENT DOCUMENTS

| | | | | |
|---|---|---|---|---|
| DE | 3323733 A1 | 3/1984 | | |
| DE | 225985 A1 | 8/1985 | | |
| EP | 1256615 A2 | 11/2002 | | |
| EP | 2610319 A1 * | 7/2013 | ............. | C08L 57/02 |
| WO | 87/00536 A1 | 1/1987 | | |
| WO | 03/097756 A1 | 11/2003 | | |
| WO | 2008/080913 A1 | 7/2008 | | |
| WO | 2008/125521 A1 | 10/2008 | | |
| WO | 2009/115610 A1 | 9/2009 | | |
| WO | 2011/033002 A1 | 3/2011 | | |
| WO | 2017/134002 A1 | 8/2017 | | |

OTHER PUBLICATIONS

International Search Report and Written Opinion issued on Sep. 23, 2019 for corresponding PCT Application No. PCT/EP2019/069781.
"Visiomer Methacrylates: Reactive Diluents for Replacing Styrene in Composite and Gel Coat Applications," 2018, pp. 1-2 XP055576672.
"Bisomer IPGMA Product Data," GEO Specialty Chemicals, 2017, pp. 1-2.
"Visiomer Glyfoma," Evonik, 2019, pp. 1-2.
"Empowering Drug Discovery," eMolecules, 2018, pp. 1-2.
"Visiomer Glyfoma—New low odor methacrylate monomer for composite resins and other reactive systems," Evonik Industries AG, 2015, pp. 1-2.
Anonymous; "Hypro 2000X168LC VTB Methacrylate-Terminated Polybutadiene," Advanced Materials Technical Datasheet, 2020, pp. 1-4.

* cited by examiner

*Primary Examiner* — Jeffrey S Lenihan
(74) *Attorney, Agent, or Firm* — POLSINELLI PC

(57) ABSTRACT

The invention relates to an acrylic structural adhesive composition containing (meth)acrylate monomers at least 20% of which is a mixture of 1,3-Dioxan-5-yl methacrylate and 1,3-Dioxolan-4-ylmethyl methacrylate, as well as block copolymers, elastomers and particles formed of a thermoplastic shell and an elastomeric core.

23 Claims, No Drawings

COMPOSITION FOR STRUCTURAL ADHESIVES

CROSS-REFERENCE TO RELATED APPLICATIONS

This application is a national stage application (under 35 U.S.C. § 371) of PCT/EP2019/069781, filed Jul. 23, 2019, which claims benefit of French Application No. 1856878, filed Jul. 24, 2018, which are incorporated herein by reference in their entireties.

The present invention relates to the field of acrylic structural adhesives (based on acrylate or methacrylate) and to uses thereof.

Structural adhesives are a good alternative to other mechanical techniques for bonding two materials, such as metals or plastics. Indeed, the force distribution is better with bonding than when alternative techniques such as riveting or welding are used. In addition, the use of bonding often makes it possible to work more rapidly, and also has the advantage of providing better insulation against external elements (dust, humidity) than the mechanical technologies.

Structural adhesives are thus used in many industrial areas, even if they have some drawbacks. Actually, the bond created during the polymerization of the adhesive (setting) is often rigid when a good mechanical resistance is required. Thus, if the elasticity of the adhesive is insufficient, a break may occur when the two parts bonded together are subjected to forces that move them away from each other. There are adhesives with good elasticity, but they often have low mechanical resistance. The Applicant has developed and described (WO2008080913 and WO2008125521) adhesives that solve this problem by the combined use of (meth)acrylate monomers, block copolymers, elastomers and core-shells (particles formed from a thermoplastic shell and an elastomeric core).

Structural adhesives are formed from two components:
  a composition (resin) containing (meth)acrylate monomers, i.e. based on acrylate or methacrylate ester monomers and
  a catalyst agent allowing the polymerization and the setting of the adhesive.

These two elements are stored in two different compartments and are mixed during the application of the adhesive. The catalyst agent is a free radical polymerization initiator, in particular based on peroxide, and is well known in the art.

(Meth)acrylate monomers (acrylate or methacrylate monomers) can be obtained, in particular, by esterification of an alcohol and a methacrylic or acrylic acid. Such monomers are known in the art and include methyl methacrylate, ethyl methacrylate, tetrahydrofurfuryl methacrylate, phenoxyethyl methacrylate, isobornyl methacrylate, glycidyl ether methacrylate, benzyl methacrylate, cyclohexyl methacrylate, trimethylcyclohexyl methacrylate, or hydroxyethyl methacrylate. Methyl methacrylate and ethyl methacrylate are the monomers commonly used in acrylic structural adhesives.

The problem with these monomers, generally used in these structural adhesives, is their strong odor after polymerization, which makes them difficult to use in industrial applications such as the automotive field.

One will generally look for performances that allow a use in several industries:
  Shear (Min 14 MPa on Aluminum (Al), preferably at least 17 MPa)
  Peeling (min 10 N/mm on Al, preferably at least 12 N/mm)
  Elongation (min 80%, preferably at least 100%)
  Rheology suitable for some thick joint formulations
  Temperature resistance of the adhesive: glass transition temperature (Tg), measured at 1 Hz, higher than 80° C.

More specifically, and for certain applications, it is advisable to develop two-component acrylic structural adhesives, with a lower odor than conventional adhesives, and essentially retaining the mechanical properties of prior art adhesives:
  a peel strength greater than 10 N/mm on aluminum, preferably greater than 13 N/mm, and even greater than 15 N/mm, and
  preferably a shear strength greater than 15 MPa, preferably greater than 18 MPa on aluminum and/or
  preferably an elongation at break greater than 80% preferably greater than 100%.

Thus, the Applicant wishes to obtain good peel strength and preferably at least good shear strength and/or good elongation at break.

The Applicant has determined that it is not sufficient to simply replace the methacrylate monomers traditionally used in the art with the new monomers existing on the market to obtain satisfactory results, but that obtaining the mechanical performances requires a new development and a drastic change in the proportions of the other components of the resin.

In that respect, WO2008080913 mentions the use of block copolymers in quantities between 10 and 30% by weight, but specifies that the preferred quantities are between 15 and 25% by weight, or even between 18 and 25% by weight. The examples describe addition of such components between 21 and 30% by weight. WO2008125521 describes the use of core-shells (particles formed from a thermoplastic shell surrounding an elastomeric core), in an amount between 2 and 20% by weight of the composition, preferably between 5 and 15% by weight. US20170306191 describes compositions containing a phosphate ester-based adhesion promoter and a high molecular weight polyamine as a polymerization accelerator.

DE 33 23 733 describes light-curing ester-ether based optical adhesives that use different monomers as mentioned, but relates to applications other than those envisaged, especially with regard to mechanical properties.

VISIOMER Methacrylates: Reactive Diluents for Replacing Styrene in Composite and Gel Coat Applications mentions Glyfoma, but does not provide any information allowing to know on what corresponds this monomer (no formula) or on the dissolution problems of block copolymers.

US2006155045A1 describes low-odour (meth)acrylic adhesives, in particular using tetrahydrofurfuryl methacrylate. These adhesives also contain a block copolymer of styrene and butadiene and/or isoprene and/or ethylene propylene-diene.

In particular, the Applicant has shown that the use of the new low-odor monomers (in particular Glyfoma) existing on the market leads to compositions that have a rheology that is not acceptable and that can't be used from an industrial point of view, when they are used alone as a substitute for methyl methacrylate. Indeed, there is a problem of viscosity that is too important and/or of gel formation as well as heterogeneity in certain mixtures, linked to the presence of agglomerates of the block copolymers. In addition, the Tg of the mixture is too low for a large number of applications. In order to solve this technical problem, the Applicant has determined that it is preferable:

to limit the quantity of block copolymers used in the blend to quantities that are less than those exemplified in the documents cited above, to increase the quantity of core-shells and/or of elastomer, Preferably to ensure that the compositions contain at least 35% or even at least 40% of polymers (liquid polymers, block copolymers, core shell), which is favorable to obtain the desired mechanical performance.

to add complementary monomers to the low-odour monomer used. In particular, monomers with a Tg greater than 105° C. should be chosen, and in particular isobornyl methacrylate (Tg 150° C.). Methacrylic acid (Tg 185° C.), which also has adhesion promoter properties, can be used as well. The Applicant has also shown that these monomers have a role in adjusting the rheology and thus make it possible to obtain compositions that can be used in industrial applications for which it is necessary to use large adhesive joints (automotive, naval or aeronautical industry).

to use a hardener (second component to be added to the resin containing the monomers to induce polymerization) which preferably contains little or no plasticizer, and a reduced water content; in particular, a hardener containing an epoxidized silane as described in WO2011033002 or US20120252978 may be used, which will increase the bond density of the polymer network formed and increase its Tg.

Surprisingly, the Applicant has shown that, in some cases, the ratio of core-shells had to be increased and the ratio of block copolymers reduced compared to what is taught or exemplified in these prior art applications in order to obtain mechanical performances similar to those described in these documents.

The Applicant has also shown that it is possible to significantly increase the ratio of polymers (core-shells, block copolymers, elastomers) in the composition in order to improve various properties of the composition and the adhesive (such as peel strength, aging or moisture resistance).

Thus, increasing the amount of elastomer-core-shell mixture helps to solve heterogeneity problems, to obtain a homogeneous composition that integrates the block copolymers and has an acceptable rheology (not too liquid).

Thus, in a first mode of realization, the invention relates to a composition that can be used in a structural adhesive, said composition comprising (by weight):

(a) Between 35% and 60% of at least one (meth)acrylate monomer, including
  i. at least 20% of a molecule of the general formula (I), a molecule of the general formula (II) or a mixture of molecules of the general formula (I) and (II)

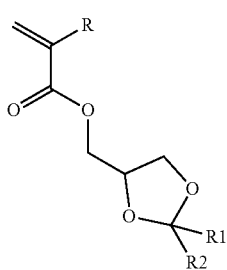

(I)

-continued

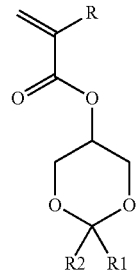

(II)

wherein R, R1 and R2 are respectively and independently H or $CH_3$,
  ii. at least 5% of one or more other (meth)acrylate monomer(s),
(b) 15-30% % of particles formed from a thermoplastic shell and an elastomeric core
(c) between 9 and 15% of an elastomeric block copolymer containing styrene and at least one second monomer or mixtures of such block copolymers
(d) between 5 and 25% of an elastomer;

the sum of the percentages of compounds (b), (c) and (d) being at least 35%.

In another embodiment, the composition is such that compound (a) is present between 35 and 55% by weight, and the sum of the percentages of compounds (b), (c) and (d) being at least equal to 40%.

It is also preferred that no other (meth)acrylate monomer is added in an amount greater than 15%, preferably greater than 10%, although their mixture may be of the order of 15 to 20%.

The composition may also contain other elements. The sum of the proportions of the components present in the composition is equal to 100%.

It is preferred when the composition contains between 25% and 35% of the monomer of general formula (I) or (II).

It is also preferred when the composition contains between 10% and 20% of at least one other monomer.

Any (meth)acrylate monomer can be added to the composition. Preferably, it is preferred that this other (meth) acrylate monomer or (meth)acrylic ester is such that the alcohol part has a linear chain (hydrocarbon side chain) of at least 6 carbon atoms (long chain).

However, it is preferred that this monomer be selected from the group consisting of isobornyl methacrylate (MAISOBOR), 2-ethylhexyl methacrylate (MA2EH), 2-ethylhexyl acrylate (A2EH), 2-hydroxyethyl methacrylate (HEMA), 2-hydroxypropyl methacrylate (HPMA), lauryl methacrylate, polyethylene glycol based esters and mixtures of these monomers.

In particular, the composition contains between 1 and 10%, preferably between 5 and 10% isobornyl methacrylate (MAISOBOR).

In particular, the composition contains at least 5% of 2-ethylhexyl acrylate or 2-ethylhexyl methacrylate. In particular, the composition contains at least 5% of 2-ethylhexyl acrylate, and not more than 10% of this compound.

A preferred mode of construction is when the particles (a), elastomeric block copolymer (b) and elastomer (c) contain butadiene (see also below).

In a second embodiment, the invention therefore relates to a composition usable in a structural adhesive, said composition comprising (by weight):

(a) Between 40% and 60% of at least one (meth)acrylate monomer, including at least 20% of a molecule of general formula (I), of a molecule of general formula (II) or of a mixture of molecules of general formula (I) and (II)

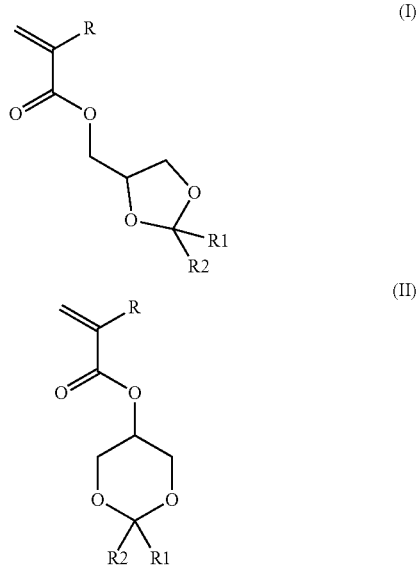

wherein R, R1 and R2 are respectively and independently H or CH$_3$,
(b) at least 20% of particles formed of a thermoplastic shell and an elastomeric core (core shell)
(c) between 8 and 13% of an elastomeric block copolymer containing styrene and at least one second monomer.
(d) between 5 and 10% of an elastomer.

The composition may also contain other elements. The sum of the proportions of the components present in the composition is 100%.

The composition therefore contains at least 20% of a molecule of general formula (I), of a molecule of general formula (II) or of a mixture of molecules of general formula (I) and (II).

Generally speaking, the structural adhesive is a bi-component, which is formed from said composition (also called resin) and a catalytic agent comprising a radical polymerization initiator preferably of the peroxide type. The mixture of the resin and the catalyst agent leads to the polymerization of the (meth)acrylate monomers (methacrylate monomers or acrylate monomers).

When R1 and R2 are hydrogens and the R substituents are identical, the two molecules (I) and (II) are isomers of each other and therefore both molecules are usually present in solution.

In solution, the following equilibrium is observed

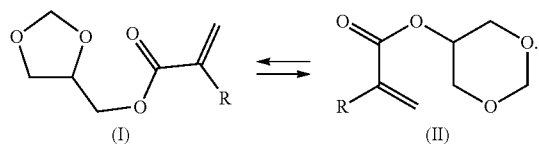

Formula (I) is changed to formula (II) by the open-chain form (opening of the ring between the two oxygen atoms).

When R is CH$_3$ and R1 and R2 are hydrogen atoms, the monomers are esters obtained by reaction of glycerine formal and methacrylic acid (2-methyl-2-propenoic acid). Glycerine formal is obtained from glycerine and formaldehyde.

When R is H and R1 and R2 are hydrogen atoms, the monomers are esters obtained by reaction of glycerine formal and acrylic acid (propenoic acid). It is recalled that glycerin formal is a mixture of 5-hydroxy-1,3-dioxane and 4-hydroxymethyl-1,3-dioxolane (resp. CAS 4740-78-7 and 5464-28-8).

In a particular embodiment, the composition, according to either embodiment presented above, has at least 20% of a mixture of molecules (I) and (II) in which the compound R is a CH$_3$, the compounds R1 and R2 are hydrogen atoms. Such a mixture is thus composed of 1,3-Dioxan-5-yl methacrylate (CAS 132977-93-6) and 1,3-Dioxolan-4-ylmethyl methacrylate (CAS 10525-59-4). Such a mixture is marketed by Evonik Industries AG, Darmstadt, Germany as VISIOMER® GLYFOMA.

The relative proportions of these two molecules, which are isomers of each other, are generally between 60:40 and 40:60.

The composition may also contain molecules (I) and (II) in which R, R1 and R2 are CH$_3$. This includes isopropylideneglycerol methacrylate (CAS 7098-80-8), marketed under the name Bisomer® IPGMA by GEO Specialty Chemicals, Inc, Ambler, PA, United States.

Such molecules of general formula (I) and (II) are well known in the art and are described in patent applications US2014128536A1 and WO2017134002.

Thus, preferably, the composition contains at least 20% of a mixture of 1,3-dioxan-5-yl methacrylate (CAS 132977-93-6) and 1,3-dioxolan-4-ylmethyl methacrylate molecules. These compounds are of particular interest as they are not included in the CMR list (based on the list of substances that are carcinogenic and/or mutagenic and/or toxic to reproduction in Annex VI of Regulation (EC) No 1272/2008 of the European Parliament and of the Council of 16 Dec. 2008).

In another embodiment, the composition contains at least 20 isopropylideneglycerol methacrylate.

In another embodiment, the composition contains at least 20% of a mixture of 1,3-dioxan-5-yl methacrylate, 1,3-dioxolan-4-ylmethyl methacrylate and isopropylideneglycerol methacrylate.

In a specific embodiment, the composition contains less than 45% by weight of the monomers of formula (I) or (II).

In this embodiment, it is preferable to add another (meth)acrylate monomer. Mixtures of such other monomers may also be added. Preferably at least 5%, but not more than 20% should be added, although it cannot be excluded that more may be used for some purposes. It is preferred to add mixtures of such other monomers in such a way that none individually exceeds 10% by weight in the composition, although up to 15% may be added for isobornyl methacrylate.

It is preferred that this other (meth)acrylate or (meth)acrylic ester monomer be such that the alcohol portion has a linear chain (hydrocarbon side chain) of at least 6 carbon atoms (long chain).

In a particular embodiment, the composition contains between 20% and 30% of molecules of formula (I) or (II) (including mixtures), and at least 15%, preferably at least 20% of another (meth)acrylic ester monomer with a long chain.

In another embodiment, the composition may contain more than 30% of molecules of formula (I) or (II) (including mixtures). In this mode of realization, one adds preferably at least about 10%, preferably at least 12% of another long chain (meth)acrylic ester monomer.

Among the (meth)acrylic ester monomers other than those of formula (I) or (II), isobornyl methacrylate (MAISOBOR), 2-ethylhexyl methacrylate (MA2EH) and 2-ethylhexyl acrylate (A2EH), 2-hydroxyethyl methacrylate (HEMA), 2-hydroxypropyl methacrylate (HPMA), lauryl methacrylate, polyethylene glycol esters or mixtures of these monomers can be added.

Thus, in a particular embodiment, one uses
a mixture of GLYFOMA and A2EH
a mixture of GLYFOMA, A2EH and HEMA
a mixture of GLYFOMA, MAISOBOR, A2EH and HEMA
a mixture of IPGMA and A2EH
a mixture of IPGMA, A2EH and HEMA
a mixture of IPGMA, MAISOBOR, A2EH and HEMA
a mixture of GLYFOMA, IPGMA and A2EH
a mixture of GLYFOMA, IPGMA, A2EH and HEMA
a mixture of GLYFOMA, IPGMA, MAISOBOR, A2EH and HEMA.

A monomer selected from the group consisting of methyl methacrylate, ethyl methacrylate, tetrahydrofurfuryl methacrylate, phenoxyethyl methacrylate, glycidyl ether methacrylate, benzyl methacrylate, cyclohexyl methacrylate, and trimethylcyclohexyl methacrylate may also be used in a small amount (less than 10% by weight, preferably less than 5% by weight). Preferably, however, no such monomer is added, or less than 2% or even less than 1% by weight is used.

In a particular embodiment, the resin contains between 2% and 5%, or even up to 10% as indicated above, by weight of a monomer mentioned above, in particular methyl methacrylate or ethyl methacrylate. Using these compounds in these proportions improves mechanical performance while limiting the appearance of undesirable odors.

In another embodiment, the composition (resin) does not contain methyl methacrylate or ethyl methacrylate. In fact, these monomers release a strong odor during polymerization, but are also flammable and present limitations and constraints of use with regard to the European REACH directive.

In the first embodiment, the composition contains 8 to 30% of particles made up of a thermoplastic shell and an elastomeric core. In a particular embodiment, one can use between 15 and 25% of such particles. In this embodiment, the quantity of elastomer is then increased so that the sum of these compounds (b) and (d) is greater than 27%, preferably greater than 29%, and even greater than 30%.

In the second embodiment, the composition contains at least 20% (by weight) of elastomeric polymeric particles (b).

These particles (b) are called "core-shell" in English, are well known to the skilled person, and are formed of a "hard" thermoplastic shell, preferably based on polymethyl methacrylate (PMMA), and an elastomeric core generally based on butadiene, often copolymerized with styrene, or based on acrylic. Butadiene-based core-shells (core containing butadiene) are particularly suitable and preferred for the implementation of the compositions described here. One can cite, for the implementation of the invention, the polymers acrylonitrile-butadiene-styrene (ABS), methacrylate-butadiene-styrene (MBS), methacrylate-acrylonitrile-butadiene-styrene (MABS) and mixtures thereof.

These particles contain a cross-linked elastomeric core surrounded by a thermoplastic shell, often a polymer of methyl methacrylate (PMMA). U.S. Pat. Nos. 3,985,703, 4,304,709, 6,433,091, EP 1256615, US20140364541 or U.S. Pat. No. 6,869,497 describe such particles, which are well known to the skilled person.

In particular, impact-modifying particles are preferred, especially MBS impact modifiers. In a preferred mode of realization, these MBS have a low cross-linking of the polymer forming the core. Moreover, these MBS, in addition to their impact resistance, preferably also present a resistance to impact-induced cracking.

Core-shell polymers are available from multiple companies. These include GE Plastics or Arkema (Paris, France). Preferred particles include Arkema's Clearstrength C301, C303H, C223, C350, C351, E920, C859 or XT100, with MBS C301, C303H and XT100 being preferred. Alternatively, Arkema's Durastrength D300 or D340, with an acrylic core surrounded by a PMMA shell, can be used. XT100 is an MMA-butadiene-styrene based core-shell. Similarly, MBS developed by Rohm and Haas (Philadelphia, PA, USA), in particular Paraloid™ BTA 753, can also be used.

These particles can be used alone or in mixtures. Thus, in a particular mode of realization of the invention, a mixture of MBS particles (in particular C303H, C301, XT100) and particles having a PMMA envelope and an acrylonitrile core (in particular D340 particles) is used.

Typically, no more than 27% or no more than 26% by weight of such particles (b) are added. Thus, in a preferred embodiment, the quantity of particles (b) formed of a thermoplastic shell and an elastomeric core is less than or equal to 26%.

In a preferred embodiment, particles (b) are selected from acrylonitrile-butadiene-styrene, methacrylate-butadiene-styrene, methacrylate-acrylonitrile-butadiene-styrene, methacrylate-acrylonitrile and mixtures thereof. Particles containing butadiene and in particular methacrylate-butadiene-styrene particles are particularly preferred.

In the first embodiment, the composition also contains between 8 and 15% of an elastomeric block copolymer containing styrene and at least one second monomer or a mixture of such block copolymers.

Preferably, the composition comprises between 8 and 14% by weight, preferably between 9 and 12% of the elastomeric block copolymer(s) (c).

In the second embodiment, the composition also contains between 8 and 13% of an elastomeric block copolymer containing styrene and at least one second monomer, or a mixture of such block copolymers.

Preferably, the composition comprises between 9 and 12% of the elastomeric block copolymer(s) (c).

In both embodiments, the second monomer is preferably selected from isoprene and butadiene. Thus, the block copolymer (c) containing styrene and at least one second monomer is preferentially selected from the group consisting of SIS, SBS, SIBS, SEBS and mixtures thereof.

When the composition contains a block copolymer containing styrene and isoprene, it may be a styrene-isoprene-styrene copolymer (SIS) or a styrene-isoprene-butadiene-styrene copolymer (SIBS). In particular, SIS D1114 (Kraton Polymers), containing about 19% polystyrene, can be used.

Thus, when the composition contains a block copolymer containing styrene and butadiene, it can be a styrene-butadiene-styrene (SBS) copolymer, such as Kraton D1102 or D1152 or a styrene-isoprene-butadiene-styrene (SIBS) copolymer such as Kraton D1171 or Kraton MD6455 (Kraton Polymers company) described by Dr. Donn DuBois et al., at the Adhesives & Sealants Council Meeting, Louisville, KY, Oct. 9-12, 2005.

When the composition contains a block copolymer containing styrene and ethylene, it can be a SEBS (styrene-ethylene/butylene-styrene copolymer) or a SEPS (styrene-ethylene/propylene-styrene copolymer). These compounds are available in the Kraton G line (Kraton Polymers).

Preferably, styrene is present in a proportion comprised between 15 and 50%, more preferably between 22 and 40%, even more preferably about 28-33% by weight of the SBS copolymer. Styrene is present in the range comprised between 12 and 24%, more preferably about 18-19% by weight in SIS or SIBS copolymers.

When the composition contains a mixture of two block copolymers (e.g. one SIS and one SIBS), the relative proportion of SIS/SIBS preferably varies in a ratio of 4:1 (by weight in the composition) to 1.5:1. The preferred proportion of SIS to the second block copolymer is about 3:1 or 3.3:1. However, a mixture of SIS and SBS in the same relative proportions as the SIS/SIBS mixture can also be used. A mixture of SIS, SIBS and SBS can also be used. Another block copolymer can also be added to one of these mixtures.

The SIS, SBS or SIBS block copolymers which can be used according to the invention are well known to skilled person. They are produced by Kraton Polymers (Houston, Texas, USA). For example, the SIS Kraton D1160 described in US 20050238603 or Kraton D1161, the SBS Kraton D1102 described in U.S. Pat. No. 5,106,917 and the SIBS Kraton MD6455 or Kraton MD 6460 can be used.

The person skilled in the art knows how to select other SIS, SIBS, SBS block copolymers that can be used in the composition according to the invention, among those existing, in particular according to their ease of dissolution in the monomers used, or their mechanical resistance in traction.

In a particular embodiment, the composition according to the invention contains an elastomeric block copolymer containing styrene and isoprene and at least one elastomeric block copolymer containing styrene and butadiene, either a SIS/SIBS mixture, a SIS/SBS mixture, or a SIS/SIBS/SBS mixture. Preferably, the composition contains a SIS/SIBS mixture. Otherwise, the composition contains only SBS, and does not contain a block copolymer containing styrene and isoprene.

In another embodiment, the composition according to the invention contains only an elastomeric block copolymer, containing styrene and isoprene, i.e. a SIS.

In another embodiment, the composition according to the invention contains only an elastomeric block copolymer SIBS.

In the first embodiment, the composition also contains between 5 and 25% of an elastomer (d), preferably between 10 and 25%. As seen above, it is preferable that the elastomer concentration be adapted according to the particle concentration (b). In the second embodiment, the composition also contains between 5 and 10% by weight of an elastomer (d).

In both embodiments, this elastomer is preferably functionalized (having a double bond at its ends, in particular methacrylate functions to improve the bonds with the monomers). In some cases, a liquid elastomer is chosen. Preferably at least one functionalized elastomer is used, alone or in mixture with at least one non-functionalized elastomer. It is recalled that an elastomer is a polymer with "elastic" properties (i.e. the ability to return to its original shape after being deformed), after cross-linking. It can therefore withstand very large deformations before breaking. One thus uses elastomers of the homopolymer type polybutadiene (which is then preferentially chosen liquid and functional-ized), or polyisoprene. One can also use polychloroprene (Neoprene AD10, DuPont, USA). Butadiene-acrylonitrile copolymer elastomers can also be used, especially when they are functionalized. The functionalities are carried by the end chains and the functional groups that can be used are carboxyl (COOH), amine (NH or NH2), vinyl methacrylate or epoxy groups. Thus, a polybutadiene (homopolymer) functionalized with vinyl terminations is particularly advantageous.

A functionalized polybutadiene such as HYPRO™ VTB 2000×168 (vinyl terminations), alone or in mixture with a polychloroprene or non-functionalized polybutadiene such as HYPRO™ CTB 2000×162 (carboxyl terminations) (Emerald Performance Materials (EPM), Cuyahoga Falls, Ohio, USA) can be used. It is also possible to use HYPRO™ VTBNX or CTBNX (butadiene-acrylonitrile copolymers) with carboxyl and vinyl functionalities respectively, and more specifically HYPRO™ VTBNX 1300×43 or 1300×33.

Sartomer's Ricacryl 3801 (methacrylated polybutadiene) can also be used. Polychloroprene (Neoprene AD10, DuPont, USA) can also be used. These elastomers can be used alone, or as mixtures (e.g. a mixture of functionalized polybutadiene and polychloroprene, or a mixture of functionalized and non-functionalized polybutadiene such as Hycar CTB 2000×162 (EPM)).

This elastomer (d) is favorably present in an amount of between 5 and 10% by weight in the composition according to the invention, preferably between 6 and 8%, more preferably between 6.5 and 7.6%.

The composition may also contain a tertiary amine of formula III:

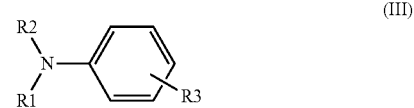

(III)

in which:
the group R3 is a resonance electron-donor group comprising at least one aromatic group which is capable of forming with the radical:

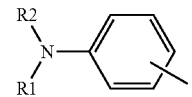

and in combination with said radical polymerization initiator, a conjugated system having absorption in the visible range of the electromagnetic spectrum, to generate coloration of said polymer or cement during the polymerization reaction of said monomer,
groups R1 and R2 are respectively and independently:
C1 to C16, preferably C1 to C5, linear or branched alkyl groups,
C5 to C30, preferably C5 to C10 aryl or arylalkyl groups,
C2 to C15, preferably C2 to C5 alkylidene groups.

In a preferred embodiment, said R3 grouping comprises at least one tertiary amine linked to an aromatic group, which makes it possible in particular to improve activation. Thus, the composition according to the invention contains tertiary polyamines, the tertiary amine groups being borne by aromatic groups. This particular architecture makes it possible to color the adhesive during the polymerization phase.

In a preferred method of production, the R3 group comprises at least two tertiary amines linked to two distinct aromatic groups and is in particular of the form:

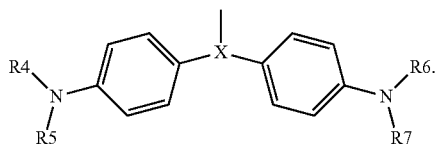

in which:
X is selected from: CH, N, and
R4, R5, R6 and R7 are selected from:
linear or branched $C_1$ to $C_{16}$, preferably $C_1$ to $C_5$, alkyl groups,
$C_5$ to $C_{30}$, preferably $C_5$ to $C_{10}$ aryl or arylalkyl groups,
$C_2$ to $C_{15}$, preferably $C_2$ to $C_5$ alkylidene groups.

It is particularly preferable to use, as polymerization accelerator in the context of the invention, a polyamine corresponding to the formula:

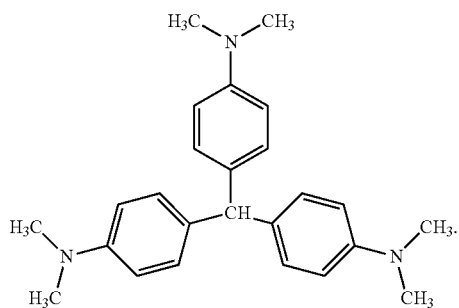 [SMILES: CN(C)c1ccc(C(c2ccc(N(C)C)cc2)c2ccc(N(C)C)cc2)cc1]

This tertiary triamine is 4,4',4" methylidynetris (N, N-dimethylaniline). It is also referred to as "crystal-violet leuco", "leuco" or "LCV". The symmetry of the molecule and the presence of three possible active sites to activate the radical polymerization initiator makes this polyamine particularly interesting.

In another embodiment, one uses the crystal violet lactone (CAS 1552-42-7), of formula

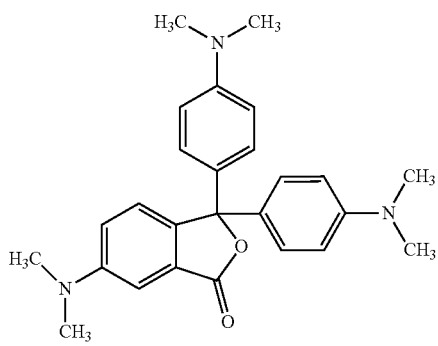

Other amines of formula (I) are described in WO 03/086327. These high molecular weight polyamines may also be to produce a composition according to the invention. It is also possible to mix several polyamines in a composition according to the invention, or to add other polymerization activators, although, in a particular embodiment, the composition does not include other polymerization activators than the amines of formula (I).

It is also possible to use an amine of formula (I) which is a tertiary diamine of formula (I) in which the R3 group is of the form:

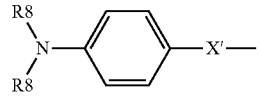

where
X is selected from: $CH_2$, O, O—$C_6H_4$—O, N—H, N—R and
R8, R9 and R are respectively and independently:
linear or branched $C_1$ to $C_{16}$, preferably $C_1$ to $C_5$ alkyl groups,
$C_5$ to $C_{30}$ aryl or arylalkyl groups, preferably $C_5$ to $C_{10}$,
$C_2$ to $C_{15}$, preferably $C_2$ to $C_5$ alkylidene groups.

The amine of formula (I) may also be chosen such that R3 is of the form

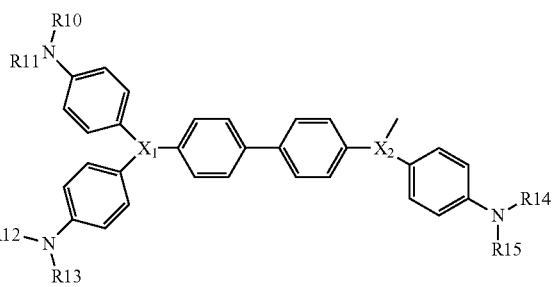

$X_1$ and $X_2$ being selected from: N and CH,
R10 to R15 being independently:
$C_1$ to $C_{16}$, preferably $C_1$ to $C_5$, linear or branched alkyl groups,
$C_5$ to $C_{30}$, preferably $C_5$ to $C_{10}$ aryl or arylalkyl groups,
$C_2$ to $C_{15}$, preferably $C_2$ to $C_5$ alkylidene groups.

Such a tertiary amine, which serves as a polymerization accelerator, is added in an amount of between 0.1 and 2% by weight in the composition, preferably between 0.2 and 1.5% by weight.

Such tertiary amines are described in WO2009115610.

The composition (resin) may also include a phosphate ester adhesion promoter. This is actually very favorable when the composition contains a high molecular weight tertiary amine of formula (III) described above.

It is preferred when the phosphate ester adhesion promoter is methacrylated. In particular, a phosphate ester-based adhesion promoter is used, which is 2-hydroxyethyl methacrylate phosphate ester. It can be obtained under the name Genorad 40 (Rahn AG, Zürich, Switzerland). Such adhesion promoters are well known in the art, and are notably described in U.S. Pat. No. 4,223,115. Examples include 2-methacryloyloxyethyl phosphate, bis-(2-methacryloyloxyethyl phosphate), bis-(2-acryloyloxyethyl phosphate), methyl-(2-methacryloyloxyethyl phosphate), ethyl-(2-methacryloyloxyethyl phosphate), a mixture of 2-hydroxyethyl methacrylate mono and di-phosphate esters (including that known as T-Mulz 1228 (Harcros Organics, Kansas City, US)) and related or derived compounds.

Between 1 and 6% by weight of this adhesion promoter is added, preferably between 2 and 4%.

The composition may also include another compound selected from saccharin and a metal acrylate monomer. This is actually very favorable when the composition contains a high molecular weight tertiary amine of formula (III) described above and the adhesion promoter based on phosphate ester.

Saccharin is a sweetener authorized at the European level under number E-954, also called 1,1-Dioxo-1,2-benzothiazol-3-one, and can be used as such, or via one of its derivatives (see WO 87/000536).

The composition may also contain a metal acrylate or methacrylate monomer (a metal salt (or similar) of acrylic or methacrylic acid), particularly a zinc-based monomer. The presence of this compound in the composition makes it possible in particular to improve the mechanical performances of the adhesive, as well as to adjust the gelling and/or exothermic times. As compound (e), monomers such as zinc diacrylate, zinc dimethacrylate, zinc monomethacrylate, iron diacrylate, iron dimethacrylate, iron monomethacrylate, calcium diacrylate, calcium dimethacrylate, calcium monomethacrylate, magnesium diacrylate, magnesium dimethacrylate, magnesium monomethacrylate can be used. The amount of this salt in the composition is between 0.5 and 3% by weight.

These compounds (high molecular weight tertiary amine, adhesion promoter, saccharin or metal acrylate or methacrylate monomer) can be used together or independently (i.e. they do not all have to be present in the resin). In particular, the adhesion promoters, saccharin and/or metal acrylate or methacrylate monomer may be present in a resin that does not include the high molecular weight tertiary amine.

High molecular weight amines, as described above, have a function as polymerization accelerator in the compositions described here, which makes it possible to accelerate the gel rise of adhesives using such compositions, and to modify the exothermic peak. As described in WO2009115610, the presence of the other compounds also makes it possible to obtain interesting technical effects.

However, it may be interesting to control the gel rise, and to delay it. This can be achieved by adding, to a composition according to the invention, an amine selected from the group of anilines, toluidines and phenols, substituted or not. In particular, are preferred para-toluidines of the formula:

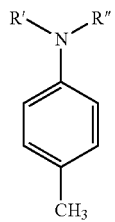

The R' and R" groups which can be used are in particular, separately and independently of each other, $C_1$ to $C_6$ alkyl groups, OH groups, $C_nH_{2n+1}OH$ groups, $OC_nH_{2n+1}$ groups with n less than or equal to 4, $OOCCH_3$ groups or similar, OR groups in which R is a $C_1$ to C6 alkyl. Particularly suitable amines (d) are N-(2-Hydroxyethyl)-N-methylparatoluidine, N,N-bis-(2-hydroxyethyl)-p-toluidine, N-methyl-N-hydroxyethyl-p-toluidine or N,N-bis-(2-hydroxyethyl)-3-methylaniline, or 2,4,6-tri(dimethylaminomethyl) phenol. The amount of these amines in the composition is between 0.5 and 3% by weight.

This amine selected from the group of substituted and unsubstituted anilines, toluidines and phenols may also be present in the composition in the absence of the high molecular weight tertiary amine.

The composition may also contain other elements, including those described below. For example, a polymerization accelerator may be used to promote polymerization and cure of the adhesive when the catalyst is added. The use of tertiary, preferably aromatic, amines such as dimethyl paratoluidine (DMPT), and/or 2,2'-(p-tolylimino)diethanol or dimethylaniline (DMA) is known in the art. These elements are added at less than 1%.

The composition may also contain other monomers such as acrylonitrile, methacrylonitrile, or styrene. Multifunctional monomers can also be used, preferably trifunctional monomers such as SR350 (trimethylolpropane trimethacrylate) or SR368 (tris (2-hydroxy ethyl) isocyanurate triacrylate).

The composition may also contain an acidic monomer such as a free radical polymerizable acidic monomer known in the art, of the type unsaturated carboxylic acid, maleic acid, crotonic acid, isophthalic acid, fumaric acid. Methacrylic acid or acrylic acid is favourably used. One adds between 2 and 10% of this compound, preferably between 3 and 7%.

The composition may also contain isobornyl acrylate (IBXA), 2-hydroxy-ethyl methacrylate (HEMA), 2-hydroxypropyl methacrylate (HPMA), 2-(perfluorooctyl) ethyl acrylate (POA), tetrahydrofurfuryl acrylate (THFA), isobutoxymethylacrylamide (IBMA). Mixtures of these compounds may be added, including a mixture of HEMA and HPMA. Between 2 and 10% of this compound is added, preferably between 3 and 7%.

The composition may also contain, in its preferred embodiments, at least one additional compound such as a rheology agent. The rheology agent serves to ensure a good viscosity of the composition according to the invention, so that it can be easily applied to the surfaces to be bonded. Polyamides such as Disparlon 6500 (Kusumoto Chemicals Ltd, Japan) or powdered silica-based elements or equivalents (fumed silica or untreated fumed silica) may be used.

The composition may also contain metal ions and/or 1-acetyl-2-phenylhydrazine (between 0.1% and 5% by weight).

Other elements such as mineral fillers ($TiO_2$, $CaCO_3$, $Al_2O_3$, zinc phosphate), ultraviolet resistant agents (such as 2-hydroxyphenyltriazine, Tinuvin 400 from Ciba-Geigy), paraffin, can also be added to the composition according to the invention. Free radical polymerization inhibitors such as BHT, or benzoquinones such as naphthoquinone, hydroquinone or ethylhydroquinone may also be added to increase the shelf life of the composition.

Examples of preferred compositions are (percentages by weight)
Total (meth)acrylate ester; 45-50%, of which
  GLYFOMA 24-36%
  Other monomers (alone or in a mixture): 19-25%.
Block copolymer (preferably SBS, SIS, SIBS alone or blend): 9-14%, of which
  SBS: 11-14%
  SIS, SIBS or mixture: 9-12.5%
Elastomer (preferably polybutadiene functionalized by vinyl ends): 6-7.6%.
Core-shells: 20-27%

Other elements (methacrylic acid, adhesion promoter, amine, fillers): 7.5-9.5%.
In particular,
Total (meth)acrylate ester; 45-50%, of which
  GLYFOMA 35-42%
  Other monomers (alone or in a mixture): 9-14%
SBS: 11-14%.
Elastomer (preferably polybutadiene functionalized by vinyl ends): 7-7.5%.
Core-shells: 20-26%
Other elements (methacrylic acid, adhesion promoter, amine, fillers): 7.5-8%.
Total (meth)acrylate ester; 45-50%, of which
  GLYFOMA 24-36%
  Other monomers (alone or mixture): 13-22%
SIS, SIBS or mixture: 9-13%.
Elastomer (preferably polybutadiene functionalized by vinyl ends): 6-7.6%.
Core-shells: 24-27%
Other elements (methacrylic acid, adhesion promoter, amine, fillers): 7.5-9.5%.
Total (meth)acrylate ester; 45-50%, of which
  GLYFOMA 24-36%
  Other monomers (alone or mixture): 12-20%, of which
    MAISOBOR 5-8%
    A2EH: 6-7%
    HEMA: 0-5%.
SIS, SIBS or mixture: 9-14%.
Elastomer (preferably polybutadiene functionalized by vinyl ends): 13-18%.
Core-shells: 17.5-20%.
Other elements (methacrylic acid, adhesion promoter, amine, fillers): qsp 100%

The invention also relates to a two-component structural adhesive comprising:
  a. a composition as described above, which is the polymerizable resin, and
  b. A polymerization catalyst agent for addition to said composition to initiate polymerization of meth(acrylate) monomers, said catalyst agent comprising a free radical polymerization initiator and optionally an epoxidized silane.

Epoxidized silanes are well known in the art. The application WO 02/051899 lists a list of epoxidized silanes that can be used in the catalyst agent. In the composition according to the invention, an epoxidized silane selected from β-(3,4-epoxycyclohexyl)-ethyltrimethoxysilane, β-(3,4-epoxycyclohexyl)ethyl-triethoxysilane, γ-Glycidoxypropyltrimethoxysilane can be used, γ-Glycidoxy-propylmethyl-dimethoxysilane, γ-Glycidoxypropylmethyldiethoxysilane, γ-Glycidoxypropylmethyltriethoxysilane, 3-Glycidyloxypropyl-triethoxysilane (GLYEO), and 3-Glycidyloxypropyl-trimethoxysilane (GLYMO) can thus be used. β-(3,4-epoxycyclohexyl)ethyl-triethoxysilane, sold under the name Coatosil 1770 (Momentive Performance Materials, Wilton, CT, United States) is particularly suitable for use with a composition as described above. Functional epoxy silane oligomers such as CoatOsil MP 200 cross linker (Momentive Performance Materials) can also be used. The epoxidized silane is usually between 1-30%, preferably between 5-20% (by weight) of the catalyst agent.

By using an epoxidized silane, it is possible to obtain compositions comprising less than 20% plasticizing agent in the catalyst agent. In certain production methods, the compositions according to the invention contain less than 15%, or even less than 12% or less than 10% (by weight) of a plasticizing agent. The term "less than xxx %" is understood to include the upper bound, and means containing "not more than xxx %". In a particular process, no plasticizer is added to the catalyst agent.

The free-radical polymerization initiator is well known to the skilled person. Thus, it is an oxidizing agent, which reacts with the reducing compounds (amines) present in the resin. This agent can thus be a peroxide, such as benzoyl peroxide (preferred agent) and any other diacyl peroxide, a hydroperoxide such as cumene hydroperoxide, a perester such as P-butylperoxybenzoate or tertbutylperoxybenzoate, a ketone hydroperoxide such as methyl ethyl ketone hydroperoxide. It may also be an organic transition metal salt, such as cobalt naphthenate, or a labile chlorine-containing compound, such as sulfonyl chloride. Typically, the catalyst agent contains between 0.5 and 50% (by weight) of this polymerization initiator, more preferably between 5 and 40% and most preferably between 10% and 20% by weight. In a preferred manner, the catalyst agent contains about 20% by weight of the polymerization initiator. The preferred agent is benzoyl peroxide. If a slower polymerization rate is desired to increase the adhesive application time, approximately 10% by weight of polymerization initiator may be used. The catalyst may also contain fillers, including mineral fillers such as silica, calcium carbonate or titanium. It may also contain stabilizing agents, thickening agents, debubbling agents or coloring agents.

In a particular embodiment, the catalyst agent also contains an epoxy resin (or epoxy resin). Such agents are described in art, in particular in WO 2003/097756. This epoxy resin is present in an amount between 10 and 60% (by weight) in the catalyst agent, preferably between 15 and 45%, more preferably between 20 and 30%.

The term "epoxy resin" covers a large number of compounds, including octadecylene oxide, glycidylmethacrylate, bisphenol A diglycidyl ether, vinylcyclohexene dioxide, 4-epoxycyclohexylmethyl-3, 4-epoxycyclohexane carboxylate, epoxy-cresol-novolacs, epoxy-phenol-novolacs, bisphenol A-based epoxy resins. Other compounds usable in the composition according to the invention are cited in WO 2003/097756.

Liquid epoxy resins based on bisphenol A, which are relatively inexpensive, such as bisphenol A diglycidyl ether, are preferred.

The invention also relates to a device, in particular a cartridge for the application of a two-component structural adhesive as described above, comprising
  i. a compartment containing the (meth)acrylic resin containing acrylate or methacrylate monomers according to formula (I), formula (II) or a mixture of molecules of formulae (I) and (II)
  ii. another compartment containing the polymerization catalyst agent.

The two compounds are brought into contact with each other and their mixture is applied to the surface of one of the two materials to be joined, then the other material is applied to the first.

In order to improve the mixing of the two components (resin and catalyst agent), a dynamic nozzle system can be used, in which the interior of the nozzle contains a screw that allows the two components to be mixed well to optimize the polymerization and homogeneity of the resin.

Alternatively, one can use static mixing nozzle systems can be used in which the geometry improves mixing (e.g. a square geometry consisting of a series of left and right elements arranged alternately with intermittent flow reversers).

The invention also relates to the combined use of a resin as described above and a catalytic agent comprising a peroxide type radical polymerization initiator in a process for adhesion of one material to a second material, in particular when at least one material is metallic.

The invention also relates to a method of bonding a first material to a second material, comprising the steps of
i. Applying a composition (resin) as described above, mixed with a polymerization catalyst agent, to the first material, and
ii. Applying the second material over the first material, the two materials being bonded to each other after polymerization of the resin.

It should be noted, however, that resins as described are also suitable for bonding other materials, such as composites, glass, especially for bonding of different materials.

The use of a composition according to the invention and of a catalyst agent thus makes it possible to perform bonding of metals, plastics, composite materials on composite and thus finds its application in particular in the field of the construction of silos, boats, cars, or truck trailers. It can also be used in the field of automobile construction, or in the railway field.

Thus, the composition allows the adhesion of a material on another material, either material being in particular a metal, a plastic, wood or a composite material. The composition can therefore be used in any of the following applications: metal/metal, metal/composite, metal/plastic, metal/wood, wood/plastic, wood/composite, wood/wood, plastic/composite, plastic/plastic, glass/polycarbonate, glass/polyamide, or composite/composite adhesion.

The composition according to the invention is also of particular interest when a material is to be bonded to a composite or metallic material.

The flexible methacrylate structural adhesives with high mechanical performance obtained with the composition according to the invention are resilient, shock and vibration resistant. They allow to realize assemblies by bonding between materials of the same chemical nature or different for example: concrete, wood, ceramics, glass, ferrites, aluminum, anodized aluminum, steel, galvanized steel, stainless steel, painted metals, steel, copper, zinc, abs, pvc, polyester, acrylics, polystyrene, polyester or epoxy Gel Coat, composite materials, fiberglass reinforced composites, laminates, honeycomb, and any painted or lacquered material. The structural adhesives obtained with the composition according to the invention are particularly interesting for bonding galvanized or electro-galvanized steel.

They can also fill large gaps between substrates of different and variable thicknesses, roughness, flatness and flatness with a better stress distribution.

The flexibility of this composition thus allows taking up the efforts of the differential dilatations between the substrates over important lengths of several meters, by decreasing and cancelling the geometrical defects (angle, roughness, flatness).

The applications and sectors of activity concerned include in particular:

Bonding of reinforcements, rails, frames, beams, stiffeners, panels, partitions, fasteners, supports, body elements, reinforcement brackets, inserts, cylindrical and conical elements, hinges, frames, etc. Bonding with resumption of lamination on partition, bonding with filling requiring a high mechanical strength.

In particular bonding of any structural or mechanical element glued in shipbuilding, automotive, railway (and infrastructure), aeronautics, aerospace, electronic equipment, electromechanical, household appliances, military structures, signs, traffic (and advertising) signs, street furniture, exterior joinery (windows, bay windows, French windows, entrance doors and garage doors), wind turbines, containers, engineering structures and infrastructure (including suspension bridges, offshore oil platforms, air terminals), construction and fastening and building facades and solar panels.

EXAMPLES

The examples below illustrate the invention without restricting its scope. The compositions described are also the subject of the invention.

Example 1: Raw Materials Used and Methodology

The following elements are used:
Composition (Resin)
  (meth)acrylate ester monomer: see below
  functionalized liquid elastomer: HYPRO™ VTB 2000×168 (EPM, USA)
  acid monomer: methacrylic acid (MAA)
  adhesion promoter: methacrylate phosphate Genorad 40 (Rahn AG)
  polymerization accelerator: N-(2-Hydroxyethyl)-N-Methyl-para-toluidine (MHPT, CAS 2842-44-6)
  toluidine (d): N,N-bis-(2-hydroxyethyl)-p-toluidine (PTE)
  Zinc dimethacrylate: SR 708 (Sartomer)
  Fillers: metal ions, rheology agents, powdery agents
  SBS copolymer: Kraton D1102 (Kraton Polymers)
  SIS copolymer: Kraton D1114 (Kraton Polymers)
  SIBS copolymer: Kraton D1171 (Kraton Polymers)
  Rheology agent: Disparlon 6500 (Kusumoto Chemicals)
  Elastomeric polymeric particles (core shells, MBS): Cleartrength C303H, XT100 (Arkema), FM50 Sundow Polymers
Catalyst Agent
  20% benzoyl peroxide, with or without epoxidized silane (see WO2011033002).
  Composition:catalyst mixing ratio=10:1

The tensile shear strength (SS) is measured according to the ISO 4587 standard. Briefly, 2024T3 aluminum test pieces measuring 100×25×1.6 mm (L×W×E) are used. Two test pieces are bonded to each other with an overlap area of 25×12 mm (300 mm$^2$) with an adhesive joint thickness of approx. 200 to 400 µm. The force required to break the bond is then measured by pulling on both test pieces.

The ISO 527 standard is used to carry out the tests to measure the elongation at break EB. Elongation is observed according to a method well known to those skilled in the art, described in particular by ISO 527, with a pull rate of the adhesive being a constant 50 mm/min.

The Tensile peel strength (PS) is evaluated according to the ISO 14173 standard. Aluminium test pieces 2024T3 measuring 200×25×1.6 mm are used, which are bonded with an overlap of 150×25 mm and an adhesive joint thickness of approx. 500 µm.

EXAMPLES

Example 1. Dissolution Test of Block Copolymers in Different Monomers

The blending capability of different monomers with SBS and SIS block copolymers was evaluated.

The reference was the monomer MMA (methyl methacrylate) which has a ratio (Monomer/(SIS-SIBS mixture or SBS mixture)) of 65/35.

THFMA (tetrahydrofurfuryl methacrylate), MAISOBOR, BZMA (Benzyl methacrylate), MA2EH, cHMA (cyclohexyl methacrylate), A2EH, LAUMA (lauryl methacrylate) were observed to have more or less the same mixing ratios as the reference (62.5/37.5 to about 75/25). On the other hand, it was complicated to obtain block copolymer ratios compatible with prior art data when mixed with IGPMA (almost impossible mixing) or GLYFOMA (no more than 20% block copolymer), due to a mixture viscosity that was unusable in practice.

Example 2. Reproduction of Prior Art Compositions with Selected Monomers

Using the monomers identified in Example 1, for which blending with block copolymers is possible, compositions similar to the compositions of the prior art (described in particular in WO2008125521A1) were tested.

The examples in this application describe compositions that include (Meth)acrylate monomer 50-60%.
Block copolymers (SBS, SIS, SIBS or blends): between 15 and 22%.
Elastomer (functionalized polybutadiene): between 7-10%.
Core-shells: 10-15%.
Other compounds: qsp 100

Compositions with the same proportions of components have been made, using the following methacrylate monomers: THFMA, MAISOBOR, BZMA, MA2EH, cHMA, LAUMA.

Shear strengths were between 3.2 and 17.4 MPa.
Peel strengths ranged from 1.6 to 9.6 N/mm.
The composition with a peel strength of 9.6 N/mm had a shear strength of 7.3 MPa.
The composition with a shear strength of 17.4 MPa had a peel strength of 3.3 N/mm.

Compositions were also prepared in which mixtures of monomers (MAISOBOR and MA2EH in various proportions, BZMA and MA2EH, or MAISOBOR, BZMA and MA2) were made. The amounts of block, core-shell or elastomer copolymers were similar to the previous art (see above).

Shear strengths ranged from 11.2 to 16.3 MPa.
Peel strengths ranged from 2.1 to 7.7 N/mm.
The composition with a peel strength of 7.7 N/mm had a shear strength of 12.6 MPa.
The composition with a shear strength of 16.3 MPa had a peel strength of 2.1 N/mm.

Thus, compositions containing MAISOBOR (29%), MA2EH (27.2%), 17.8% SBS, 7.5% VTB, 10% core-shells were made, and a peel strength lower than 3.2 N/mm was obtained.

Using a mixture of BZMA (41.1%) and MA2EH (14.4%), SBS (18.1%), VTB (7.7%), core-shells (11.2%), a peel strength of 5.9 N/mm was obtained.

Thus, simply substituting methyl methacrylate with monomers (or mixtures of monomers) having a lower odor than methyl methacrylate, in prior art compositions does not allow the mechanical properties of these prior art compositions to be maintained. Generally speaking, it is very complicated to obtain a good peel strength of more than 10 N/mm.

Example 3. Compositions with Low Odor and Good Mechanical Properties

In order to obtain compositions with a low odor and mechanical performance similar to those of the prior art compositions (WO2008125521A1 or WO2008080913), the inventors increased the amount of core-shell and decreased the amount of block copolymers.

Surprisingly, these changes in proportions, and the use of the monomers that were not selected after the results obtained in Example 1, lead to results similar to those of the prior art and much better than those obtained in Example 2 alone.

TABLE 1

Results obtained with various compositions.

| | 1 | 2 | 3 | 4 | 5 |
|---|---|---|---|---|---|
| GLYFOMA | 51.4 | 42.2 | 36.2 | 25.9 | 35.8 |
| IPGMA | | | | | |
| MAISOBOR | | | | 6.3 | |
| MA2EH | | | | 12.6 | |
| A2EH | | 9.6 | 8.3 | | 8.3 |
| HEMA | | | 5 | 4.5 | 5 |
| SBS D1102 | 9.8 | 13.6 | 11.8 | | |
| SIS D1114 | | | | 7 | 9.2 |
| SIBS D1171 | | | | 2.2 | 2.9 |
| VTB2000x168 | 6.8 | 7 | 6.1 | 9.9 | 6.1 |
| AMA | 4.5 | 4.6 | 4 | 5.3 | 4 |
| GENORAD 40 | 2.1 | 2.1 | 3 | 3.1 | 3 |
| MHPT | 0.5 | 0.4 | 0.3 | 0.3 | 0.4 |
| PTE | 0.3 | 0.3 | 0.3 | 0.2 | 0.3 |
| XT100 (MBS) | 24.6 | 20.2 | 25 | 22.7 | 25 |
| Total | 100 | 100 | 100 | 100 | 100 |
| SS (Mpa) | 22 | 18.3 | ND | 20.5 | ND |
| PS (N/mm) | 12 | 14 | 10.8 | 10.4 | 17 |
| EB (%) | 12 | 117 | ND | 40 | 192 |

| | 6 | 7 | 8 | 9 | 10 |
|---|---|---|---|---|---|
| GLYFOMA | 29.4 | 24.1 | 26.1 | 24.5 | |
| IPGMA | | | | | 27.6 |
| MAISOBOR | 8 | 10 | 10.1 | 15 | 8 |
| MA2EH | | | | | |
| A2EH | 6.7 | 10 | 7.4 | 5 | 10 |
| HEMA | 5 | 5 | 4.7 | 5 | 4 |
| SBS D1102 | | | | | |
| SIS D1114 | 7.2 | 8.2 | 7.1 | 7.9 | 7.4 |
| SIBS D1171 | 2.2 | 2.6 | 2.2 | 2.5 | 2.3 |
| VTB2000x168 | 7.6 | 7.5 | 7.1 | 7.5 | 7.5 |
| AMA | 4 | 4 | 3.8 | 4 | 4 |
| GENORAD 40 | 3 | 3 | 5 | 3 | 3.5 |
| MHPT | 0.3 | 0.4 | 0.3 | 0.4 | 0.4 |
| PTE | 0.2 | 0.2 | 0.2 | 0.2 | 0.3 |
| XT100 (MBS) | 26.4 | 25 | 26 | 25 | 25 |
| Total | 100 | 100 | 100 | 100 | 100 |
| Mechanical results | | | | | |
| SS (Mpa) | ND | ND | ND | 19 | 14.4 |
| PS (N/mm) | 15.7 | 14 | 17 | 14.7 | 10.6 |
| EB (%) | 146 | 153 | 80 | 56 | 220 |

ND: not determined

The results presented above clearly show that the increase in the amount of particles formed from a thermoplastic shell and an elastomeric core (core-shells) above 20%, and the decrease in the amount of block copolymers (SBS, SIS, SIBS), using at least 20% of compounds of the general formula (I) or (II), alone or with other methacrylate monomers, gives compositions with a peel strength of more than 10 N/mm and good shear strength and/or elongation at break.

In most cases, good peel strength, good shear strength and good elongation at break are obtained, although in some cases only good peel strength and good shear strength without significant elongation at break, or good peel strength, good elongation at break, and somewhat lower shear strength can be observed.

In addition, the adhesives obtained have a low odor compared to the adhesives of the prior art obtained with methyl methacrylate as a monomer. In particular, the use of GLYFOMA or IGPMA makes it possible to considerably reduce (practically eliminate) odours, thus making these adhesives easy to use on production lines (automotive, electronics, etc.).

Other compositions have also been prepared.

TABLE 2

Results obtained with various compositions

|  | 11 | 12 | 13 | 14 | 15 |
|---|---|---|---|---|---|
| GLYFOMA | 29.7 | 28.1 | 28.1 | 31.8 | 30.5 |
| MAISOBOR | 7.3 | 5.2 | 1.0 | — | 7.6 |
| A2EH | 6.8 | 6.5 | 6.5 | 6.5 | 7.0 |
| HEMA | 4.7 | 4.0 | 3.1 | 5.1 | 4.9 |
| SBS D1102 |  |  |  | 13.9 |  |
| SIS D1114 | 7.5 | 7.2 | 7.2 | — | 7.8 |
| SIBS D1171 | 2.3 | 2.2 | 2.2 | — | 2.4 |
| VTB2000x168 | 13.1 | 18.0 | 25.0 | 18 | 13.6 |
| AMA | 5.2 | 5.8 | 5.0 | 2.9 | 5.4 |
| GENORAD 40 | 3.0 | 3.0 | 3.0 | 3 | 3.5 |
| MHPT | 0.5 | 0.5 | 0.5 | 0.5 | 0.5 |
| PTE | 0.5 | 0.5 | 0.5 | 0.5 | 0.5 |
| XT100 (MBS) | 19.4 | 19.0 | 17.9 | 17.8 | — |
| C303H (MBS) | — | — | — | — | 16.3 |
| Total | 100 | 100 | 100 | 100 | 100 |
| SS (Mpa) | 20.1 | 17.5 | 17.0 | 20.4 | 19.1 |
| PS (N/mm) | 14.5 | 16.3 | 16.7 | 11.5 | 10.2 |
| EB (%) | 100.4 | 155.2 | 136.9 | 117.8 | 110.3 |

The above examples show that the observed performance can be maintained by varying the amounts of monomers and other compounds. Tg are also acceptable (above 80° C.). Thus, by following the teaching of the application (nature and proportions of components to be used), one of skill in the art is able to adapt the different proportions while maintaining performances as described above.

The invention claimed is:

1. A composition that can be used in a structural adhesive, the composition comprising by weight:
   (a) between 35% and 60% of (meth)acrylate monomers, including
      (i) at least 20% of a monomer of formula (I), a monomer of formula (II), or a mixture thereof

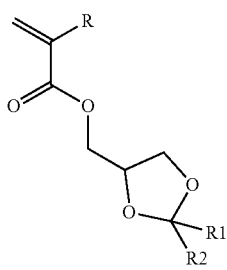

(I)

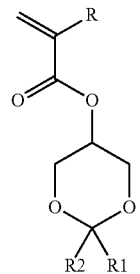

(II)

wherein R, R1, and R2 are independently H or $CH_3$, and
      (ii) at least 5% of one or more other (meth)acrylate monomer(s) selected from the group consisting of isobornyl methacrylate, 2-ethylhexyl methacrylate, 2-ethylhexyl acrylate and 2-hydroxyethyl methacrylate,
   (b) between 15 to 30% of particles formed from a thermoplastic shell and an elastomeric core, wherein the particles are chosen from acrylonitrile-butadiene-styrene, methacrylate-butadiene-styrene, methacrylate-acrylonitrile-butadiene-styrene, methacrylate-acrylonitrile particles, and mixtures thereof,
   (c) between 9 and 15% of an elastomeric block copolymer comprising styrene and at least one second monomer, or a mixture of such block copolymers, and
   (d) between 5 and 25% of an elastomer selected from the group consisting of non-functionalized polybutadiene, polybutadiene functionalized by carboxyl ends, polybutadiene functionalized by vinyl ends, methacrylated polybutadiene, and mixtures thereof;
   wherein the sum of components (b), (c), and (d) is at least 35%.

2. The composition according to claim 1 comprising a mixture of the monomer of formula (I) and the monomer of formula (II) that is a mixture of 1,3-dioxan-5-yl methacrylate and 1,3-dioxolan-4-ylmethyl methacrylate.

3. The composition according to claim 1 comprising between 25 and 35% of the monomer of formula (I) and/or the monomer of formula (II), and at least 10% of the other (meth)acrylate monomer(s).

4. The composition according to claim 1, further comprising at least 5% of 2-ethylhexyl acrylate.

5. The composition according to claim 1, wherein the particles of (b), the elastomeric block copolymer of (c), and the elastomer of (d) contain butadiene.

6. The composition according to claim 1 comprising from 15 to 25% of the particles of (b), wherein the particles consist of a thermoplastic shell and an elastomeric core.

7. The composition according to claim 1 comprising between 9 and 12% of the elastomeric block copolymer of (c).

8. The composition according to claim 1 comprising between 10 and 25% of the elastomer of (d).

9. The composition according to claim 1 comprising from 20 to 26% of the particles of (b).

10. The composition according to claim 1, wherein the second monomer of the elastomeric block copolymer of (c) is chosen from isoprene and butadiene.

11. The composition according to claim 1, wherein the elastomeric block copolymer of (c) is chosen from SIS, SBS, SIBS, SEBS, and mixtures thereof.

12. The composition according to claim 1, further comprising an amine chosen from toluidines, anilines, and substituted or unsubstituted phenols.

13. The composition according to claim 1, further comprising a crystal violet lactone or 4,4',4" methylidynetris (N, N-dimethylaniline).

14. The composition according to claim 1, further comprising a phosphate ester-based adhesion promoter.

15. The composition according to claim 14, wherein the phosphate ester-based adhesion promoter is 2-hydroxyethyl methacrylate phosphate ester or a mixture of 2-hydroxyethyl methacrylate mono- and di-phosphate esters.

16. The composition according to claim 1, further comprising a metal acrylate monomer.

17. A two-component structural adhesive comprising:
  a. a composition according to claim 1, and
  b. a polymerization catalyst agent, for addition to the composition to initiate polymerization of the meth (acrylate) monomers, comprising a free radical polymerization initiator.

18. The two-component structural adhesive according to claim 17, wherein the free radical polymerization initiating agent is a peroxide is in an amount between 5 and 40% by weight of polymerization initiating agent.

19. The two-component structural adhesive according to claim 17, wherein the polymerization catalyst agent, further comprises between 1 and 30% by weight of an epoxidized silane.

20. The two-component structural adhesive according to claim 17, wherein the polymerization catalyst agent further comprises an epoxy resin.

21. A cartridge for applying a two-component structural adhesive according to claim 17 comprising:
  (i) a compartment containing the composition; and
  (ii) another compartment containing the polymerization catalyst agent.

22. A method of bonding a first material to a second material comprising:
  (i) applying a composition according to claim 1 mixed with a polymerization catalyst agent comprising a free radical polymerization initiator to the first material, and
  (ii) applying the second material over the first material, thereby bonding the two materials to each other after polymerization.

23. The composition of claim 1, further comprising at least one additional compound chosen from trimethylolpropane trimethacrylate and tris (2-hydroxy ethyl) isocyanurate triacrylate.

* * * * *